US008879074B2

(12) United States Patent
Nash

(10) Patent No.: US 8,879,074 B2
(45) Date of Patent: Nov. 4, 2014

(54) PROTECTING SCANS USING REMOTE SCAN INITIATION MODE AND AUTHORIZATION

(75) Inventor: Thomas W. Nash, Irondequoit, NY (US)

(73) Assignee: Xerox Corporation, Norwalk, CT (US)

( * ) Notice: Subject to any disclaimer, the term of this patent is extended or adjusted under 35 U.S.C. 154(b) by 417 days.

(21) Appl. No.: 13/157,451

(22) Filed: Jun. 10, 2011

(65) Prior Publication Data

US 2012/0314239 A1 Dec. 13, 2012

(51) Int. Cl.
*G06F 15/00* (2006.01)
*G06K 1/00* (2006.01)
*G06F 3/12* (2006.01)

(52) U.S. Cl.
USPC ............................ 358/1.13; 358/1.15; 358/1.9

(58) Field of Classification Search
None
See application file for complete search history.

(56) References Cited

U.S. PATENT DOCUMENTS

| 6,032,004 | A | 2/2000 | Mirabella, Jr. et al. | |
| RE37,031 | E | 1/2001 | Nishiwaki | |
| 6,768,877 | B2 | 7/2004 | Alegria et al. | |
| 7,012,706 | B1 | 3/2006 | Hansen | |
| 7,353,998 | B2 | 4/2008 | Bechtel et al. | |
| 7,716,718 | B2 | 5/2010 | Asada et al. | |
| 2003/0121982 | A1 | 7/2003 | Charpentier | |
| 2005/0156750 | A1* | 7/2005 | Kagawa | 340/686.1 |
| 2006/0072144 | A1* | 4/2006 | Dowling et al. | 358/1.15 |
| 2006/0077430 | A1* | 4/2006 | Zhang et al. | 358/1.15 |
| 2006/0132829 | A1 | 6/2006 | Dicken et al. | |
| 2007/0079363 | A1 | 4/2007 | Itoh | |
| 2007/0223036 | A1 | 9/2007 | Liao | |
| 2007/0282995 | A1* | 12/2007 | Mizuno et al. | 709/223 |
| 2008/0080022 | A1 | 4/2008 | Gogulapati | |
| 2008/0080887 | A1 | 4/2008 | Suzuki | |
| 2008/0144127 | A1* | 6/2008 | Tian | 358/474 |
| 2009/0070864 | A1* | 3/2009 | Nishida | 726/7 |
| 2010/0073740 | A1* | 3/2010 | Kojima | 358/474 |
| 2010/0134822 | A1* | 6/2010 | Kimura et al. | 358/1.14 |
| 2010/0245883 | A1 | 9/2010 | Matsushita | |

OTHER PUBLICATIONS

Microsoft XP Professional Remote Desktop <http://lbl.gov/ITSD/CIS/rdc> dated Feb. 27, 2009.*

* cited by examiner

*Primary Examiner* — Ming Hon
(74) *Attorney, Agent, or Firm* — Gibb & Riley, LLC

(57) ABSTRACT

Systems and methods allow remote computerized devices to control the scanner of an apparatus through the communications port of the apparatus. Additionally, systems and methods provide a user-selectable remote start option on the graphic user interface of the apparatus and require input of user credentials through the graphic user interface when a user selects the remote start option. The scanner is placed into private mode when a user selects the remote start option, which restricts scanner control to only those of the remote computerized devices that provide the proper user credentials. Further, a user-selectable private mode release option is provided on the graphic user interface, which requires input of the user credentials through the graphic user interface. When scanning, the scanner produces scanned images, which are released through the communications port to only those of the remote computerized devices that provide the proper user credentials. Additionally, in said private mode the user's original documents can, optionally, be protected via a lockable cover controllable by the remote start option.

20 Claims, 3 Drawing Sheets

PROTECTING SCANS USING REMOTE SCAN INITIATION MODE AND AUTHORIZATION

BACKGROUND

Embodiments herein generally relate to devices that include scanners, such as multi-function printing devices (MFD) and more particularly to devices that restrict remote scanner access to only those computerized devices that can provide proper credentials.

With the increasing need to process paper documents electronically, there is a greater desire to provide scanner access. However, the privacy of the user needs to be maintained and it is important to avoid the potential for someone other than the document owner to capture scans without permission.

SUMMARY

In view of the foregoing, the embodiments herein allow remote computerized devices to control the scanner of an apparatus through the communications port of the apparatus. Additionally, the embodiments herein provide a user-selectable remote start option on the graphic user interface of the apparatus and require input of user credentials through the graphic user interface when a user selects the remote start option. The scanner is placed into private mode when a user selects the remote start option, which restricts scanner control to only those of the remote computerized devices that provide the proper user credentials. Further, a user-selectable private mode release option is provided on the graphic user interface, which requires input of the user credentials through the graphic user interface. When scanning, the scanner produces scanned images, which are released through the communications port to only those of the remote computerized devices that provide the proper user credentials.

Therefore, an apparatus herein (which can be a MFD, a facsimile machine, a stand-alone scanner, etc.) can include a document handler (connected to, or including a scanner). The document handler is operatively connected to (meaning directly or indirectly connected to) a processor. Also, a lockable cover can optionally be positioned over the document handler. Such a lockable cover prevents access to (scanned or yet-to-be scanned) documents within the document handler when locked. Further, a communications port is also operatively connected to the processor, and the communications port allows remote computerized devices to control the document handler, the scanner, and the lockable cover.

A graphic user interface is similarly operatively connected to the processor. The graphical user interface includes a user-selectable "remote start" option (which can be a dedicated hard button, a menu selection made using any form of cursor, a soft button on, for example, a touchscreen, etc.). The graphic user interface requires input of proper user credentials (such as a password/passcode, user identification, etc.) when a user selects the remote start option. The processor then places the scanner into private mode when the user selects the remote start option. While the scanner is in the private mode, the processor locks the lockable cover (if included) and restricts document handler control to only those of the remote computerized devices that provide the proper user credentials. Similarly, the graphic user interface includes a user-selectable private mode "release" option as above, and the graphic user interface again can require input of the user credentials when a user selects the private mode release option.

While scanning the documents, the scanner produces scanned images, and the processor releases the scanned images through the communications port to only those of the remote computerized devices that provide the proper user credentials. The graphic user interface is integral with the apparatus; however, the remote computerized devices are not integral with the apparatus and are connected to the communications port by a network.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, during scanning, the privacy of the user needs to be maintained and it is important to avoid the potential for someone other than the document owner to capture scans or retrieve originals without permission. In order to address these concerns, the embodiments herein provide an option on the multi-function device/scanning device to place the apparatus into a private mode for a short time, to allow the user to scan their documents while locking out others. In order for the customer to initiate a scan and retrieve the data, they must enter the appropriate credentials.

Therefore, the embodiments herein provide a way for the device to require document owner credentials, and to authorize those credentials in accord with an appropriate authorization mechanism as defined by the document owner—in effect leaving all other users blocked from capturing scans from that scanner. The credential protected scan path is implemented in such a way that only the owner of the document is authorized to capture the scan of the original documents.

Thus, embodiments herein provide a private mode that temporarily allows scan communication only between the MFD and a specified remote station. This can be performed by local user interface blocking, subnet locking, encryption, local user interface blocking access to the MFD, etc. Should another individual attempt to access the blocked service, the user display shows a message such as "This service is currently not available, please wait".

Such subnet locking allows communication only between the MFD and a specified work platform by utilizing, for example, Internet Protocol (IP) filtering, IPSec sub-netting, or other facilities. When encryption is utilized, the embodiments herein protect the scanned images from intrusion, while in transit by, for example, tying the traffic to the IPSec features currently provided by many existing systems.

Figure 1:
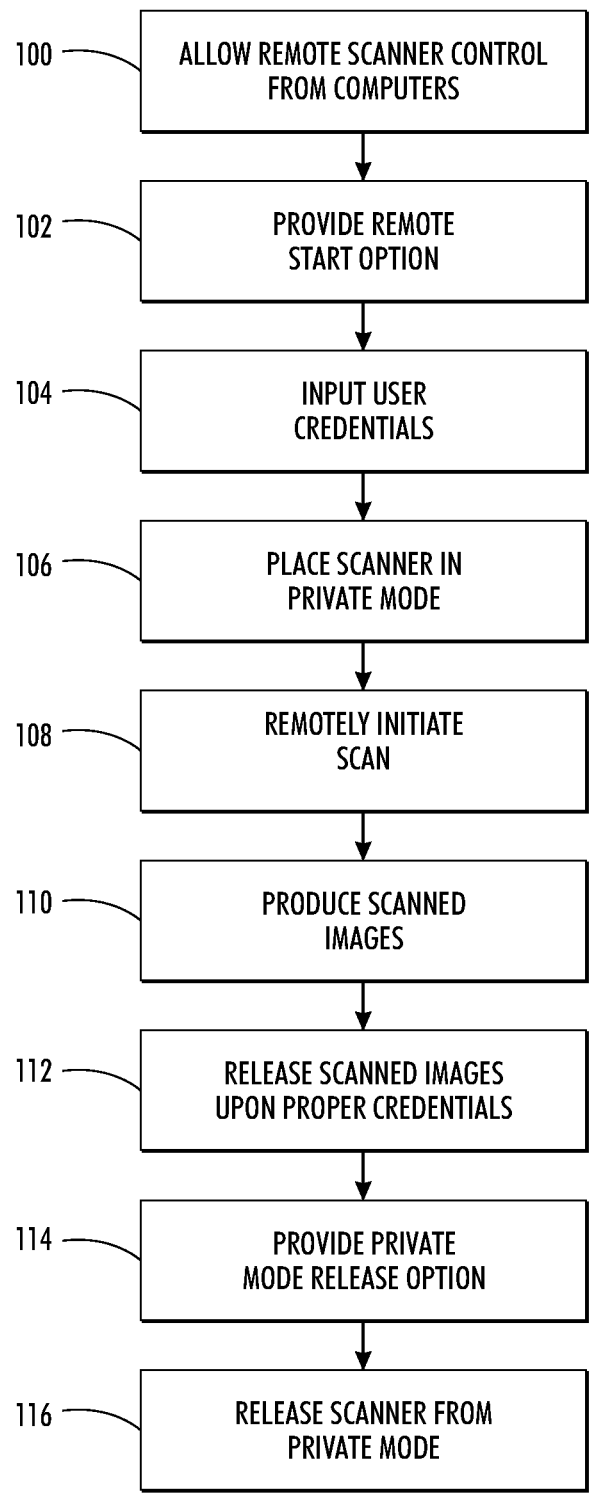
FIG. 1 is a flow diagram illustrating various embodiments herein.

FIG. 1 is flowchart illustrating an exemplary method herein. In item 100, the embodiments herein allow remote computerized devices to control the scanner of an apparatus through the communications port of the apparatus. Additionally, the embodiments herein provide a user-selectable remote start option on the graphic user interface of the apparatus in item 102 and require input of user credentials through the graphic user interface when a user selects the remote start option, in item 104.

The scanner is placed into private mode when a user selects the remote start option in item 106, which restricts scanner control to only those of the remote computerized devices that provide the proper user credentials. In item 108, the user remotely initiates the scanning process by sending a scanning instruction containing the proper credentials from one of the remote computerized devices to the scanner (through the communications port).

When scanning, the scanner produces scanned images (item 110) that are released through the communications port to only those of the remote computerized devices that provide the proper user credentials (item 112).

The communications between the scanning device and the remote computerized device can be through local area networks or wide area networks, such as the Internet, using various Internet Protocols. As mentioned above, the credentials can be verified using processes such as Internet Protocol (IP) filtering, IPSec sub-netting, etc.

Further, a user-selectable private mode release option is provided on the graphic user interface in item 114, which requires input of the user credentials through the graphic user interface. Upon successfully supplying such credentials for the private mode release option, in item 116 the processor of the apparatus then releases the scanner from the private mode, thereby allowing any of the remote computerized devices to control the scanner.

Figure 2:
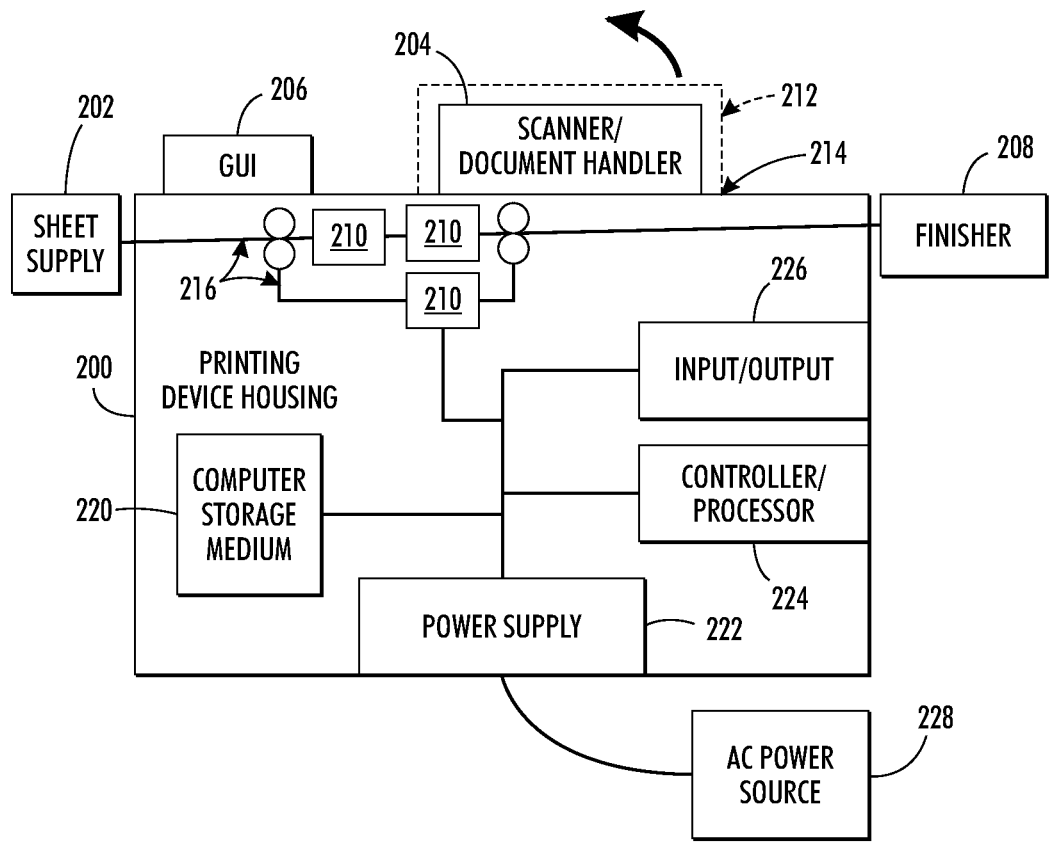
FIG. 2 is a side-view schematic diagram of a device according to embodiments herein.

FIG. 2 illustrates a computerized apparatus/machine 200, which can be used with embodiments herein and can comprise, for example, a printer, copier, multi-function printing device, facsimile machine, stand-alone scanner, etc. (which is often referred to herein simply as an MFP 200). The MFD 200 includes a controller/processor 224, at least one marking device (printing engines) 210 operatively connected to the processor 224, a media path 216 positioned to supply sheets of media from a sheet supply 202 to the marking device(s) 210, and a communications port (input/output) 226 operatively connected to the processor 224 and to a computerized network (local or wide area) external to the printing device. After receiving various markings from the printing engine(s), the sheets of media can optionally pass to a finisher 208 which can fold, staple, sort, etc., the various printed sheets.

Also, the MFD 200 can include at least one accessory functional component (such as a scanner/document handler 204, sheet supply 202, finisher 208, etc.) and graphic user interface assembly 206 that also operate on the power supplied from the external power source 228 (through the power supply 222).

The input/output device 226 is used for communications to and from the multi-function MFD 200. The processor 224 controls the various actions of the printing device. A non-transitory computer storage medium device 220 (which can be optical, magnetic, capacitor based, etc.) is readable by the processor 224 and stores instructions that the processor 224 executes to allow the multi-function printing device to perform its various functions, such as those described herein.

Thus, a printer body housing 200 has one or more functional components that operate on power supplied from the alternating current (AC) 228 by the power supply 222. The power supply 222 connects to an external alternating current power source 228 and converts the external power into the type of power needed by the various components.

As would be understood by those ordinarily skilled in the art, the MFD 200 shown in FIG. 2 is only one example and the embodiments herein are equally applicable to other types of scanning devices that may include fewer components or more components. For example, while a limited number of printing engines and paper paths are illustrated in FIG. 2, those ordinarily skilled in the art would understand that many more paper paths and additional printing engines could be included within any printing device used with embodiments herein.

Although not shown directly in the drawings, the document handler 204 is operatively connected to (meaning directly or indirectly connected to) the processor 224. Further, the scanner/document handler 204 can comprise any well-known document handler and/or scanner.

Also, a lockable cover 212 can optionally be positioned over the document handler 204 (and it is therefore shown using dashed lines in FIG. 2). In one example, the lockable cover 212 could be hinged in order to open in the direction shown by the curved arrow in FIG. 2 and could include an electronically controlled lock 214, that is operatively connected to the processor 224, and that can be locked or unlocked automatically by the processor 224. Such a lockable cover 212 prevents access to (scanned or yet-to-be scanned) documents within the document handler 204 when closed and locked. The communications port 226 allows remote computerized devices to control the document handler 204, the scanner 204, and the lockable cover 212.

Thus, the embodiments herein can use a physical cover with a physical key, key card, key pad, etc. Once the cover is secured it can only be released by the original person or security manager. Additionally, different embodiments herein can include a secondary non-locked scanner, so regular jobs can continue during the period of time when the secure scanner is locked.

Figure 3:
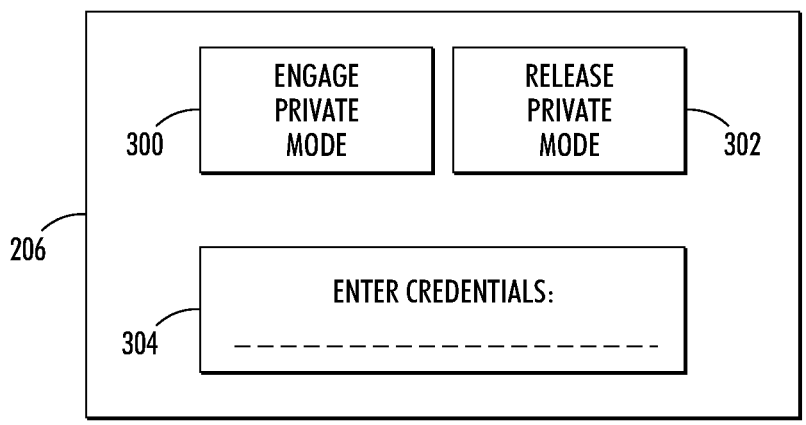
FIG. 3 is a schematic diagram of a graphic user interface according to embodiments herein.

As shown in FIG. 3, the graphical user interface 206 includes a user-selectable "remote start" option 300 (which can be a dedicated hard button, a menu selection made using any form of cursor, a soft button on, for example, a touchscreen, etc.). The graphic user interface 206 requires input of proper user credentials (such as a password/passcode, user identification, key, etc.) when a user selects the remote start option. For example, entry field 304 could be used to supply the user's credentials. The processor 224 places the scanner 204 into private mode when the user selects the remote start option 300.

While the scanner 204 is in the private mode, the processor 224 locks the lock 214 on the lockable cover 212 (if included) and restricts document handler 204 control to only those of the remote computerized devices that provide the proper user credentials. Similarly, the graphic user interface 206 includes a user-selectable private mode "release" option 302 (which can be a dedicated hard button, a menu selection made using any form of cursor, a soft button on, for example, a touchscreen, etc., as above) and the graphic user interface 206 again requires input of the user credentials when a user selects the private mode release option (using, for example, field 304).

While scanning the documents, the scanner 204 produces scanned images, and the processor 224 releases the scanned images through the communications port 226 to only those of the remote computerized devices that provide the proper user credentials. The graphic user interface 206 is integral with the apparatus; however, the remote computerized devices are not integral with the apparatus and are connected to the communications port 226 by a network.

Figure 4:
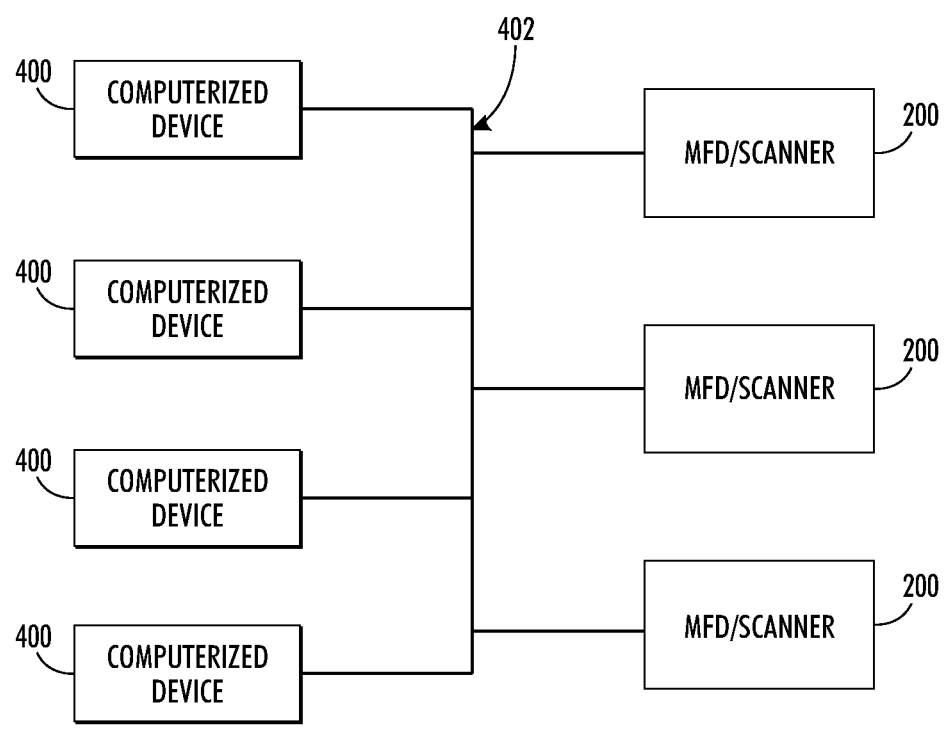
FIG. 4 is a schematic diagram of a system according to embodiments herein.

In an exemplary diagram shown in FIG. 4, a plurality of such scanning/printing devices 200 are connected to a plurality of remote computerized devices 400 by way of a local or wide area network 402. In an exemplary workflow, a customer approaches one of the scanning devices 200 with one or more original documents. The originals are loaded on the document handler, platen, scanner, etc. 204, of the machine 200. The customer chooses remote start graphic user interface 300 of the scanning device 200. This puts the machine 200 into private mode, where authorization of the document owner is required for release of the scan. The customer returns to their workstation 400 and initiates their scan by inputting the proper credentials into remote computerized device 400.

The customer is prompted, at their remote workstation 400 for the credentials required to release the job (using an input screen that could appear similar to the one shown in FIG. 3). The credentials entered into the remote computerized device 400 must match the credentials that were imported into the scanning device 200 and, if the credentials do not match, remote control of the scanning device 200 is not permitted and an error message is displayed on the computerized device 400.

After successfully entering proper credentials into the computerized device 400, the scanning device 200 automatically completes the scan remotely. The customer then returns to the scanning device 200. Depending upon the amount of security required, the scanning device 200 can be automatically released from private mode when the scan is completed (or when the documents are removed from the document handler 204). Alternatively, for more security, the scanning device 200 may not be released from private mode until the private mode release button 302 is executed and the appropriate credentials are entered. Such credentials would also have to be entered into either device 200 or 400 to cause the lock 214 to release the lockable cover 212.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. An apparatus comprising:

a processor;

a scanner operatively connected to said processor;

a communications port operatively connected to said processor, said communications port allowing remote computerized devices to control said scanner; and a graphic user interface operatively connected to said processor, said graphical user interface including a user-selectable remote start option, said graphic user interface requiring input of user credentials when a user selects said remote start option, said processor placing said scanner into private mode when said user selects said remote start option, and while said scanner is in said private mode, said processor restricts scanner access and control to only a remote computerized device of said user that provides said user credentials.

2. The apparatus according to claim 1, said graphic user interface including a user-selectable private mode release option, said graphic user interface requiring input of said user credentials when a user selects said private mode release option.

3. The apparatus according to claim 1, said scanner producing scanned images, said processor releasing said scanned images through said communications port to only ones of said remote computerized devices that provide said user credentials.

4. The apparatus according to claim 1, said graphic user interface being integral with said apparatus.

5. The apparatus according to claim 1, said remote computerized devices being connected to said communications port by a network.

6. An apparatus comprising:

a processor;

a scanner operatively connected to said processor;

a lockable cover over said scanner, said lockable cover preventing access to said scanner when locked;

a communications port operatively connected to said processor, said communications port allowing remote computerized devices to control said scanner and said lockable cover; and a graphic user interface operatively connected to said processor, said graphical user interface including a user-selectable remote start option, said graphic user interface requiring input of user credentials when a user selects said remote start option, said processor placing said scanner into private mode when said user selects said remote start option, and while said scanner is in said private mode, said processor locks said lockable cover and restricts scanner access and control to only a remote computerized device of said user that provides said user credentials.

7. The apparatus according to claim 6, said graphic user interface including a user-selectable private mode release option, said graphic user interface requiring input of said user credentials when a user selects said private mode release option.

8. The apparatus according to claim 6, said scanner producing scanned images, said processor releasing said scanned images through said communications port to only ones of said remote computerized devices that provide said user credentials.

9. The apparatus according to claim 6, said graphic user interface being integral with said apparatus.

10. The apparatus according to claim 6, said remote computerized devices being connected to said communications port by a network.

11. An apparatus comprising:
   a processor;
   a document handler comprising a scanner, said document handler being operatively connected to said processor;
   a lockable cover over said document handler, said lockable cover preventing access to documents within said document handler when locked;
   a communications port operatively connected to said processor, said communications port allowing remote computerized devices to control said document handler, said scanner, and said lockable cover; and
   a graphic user interface operatively connected to said processor,
   said graphical user interface including a user-selectable remote start option,
   said graphic user interface requiring input of user credentials when a user selects said remote start option,
   said processor placing said scanner into private mode when said user selects said remote start option, and
   while said scanner is in said private mode, said processor locks said lockable cover and restricts document handler access and control to only a remote computerized device of said user that provides said user credentials.

12. The apparatus according to claim 11, said graphic user interface including a user-selectable private mode release option, said graphic user interface requiring input of said user credentials when a user selects said private mode release option.

13. The apparatus according to claim 11, said scanner producing scanned images, said processor releasing said scanned images through said communications port to only ones of said remote computerized devices that provide said user credentials.

14. The apparatus according to claim 11, said graphic user interface being integral with said apparatus.

15. The apparatus according to claim 11, said remote computerized devices being connected to said communications port by a network.

16. A method comprising:
   allowing remote computerized devices to control a scanner of an apparatus through a communications port of said apparatus;
   providing a user-selectable remote start option on a graphic user interface of said apparatus;
   requiring input of user credentials through said graphic user interface when a user selects said remote start option;
   placing said scanner into private mode when said user selects said remote start option; and
   restricting scanner control to only a remote computerized device of said user that provides said user credentials while said scanner is in said private mode.

17. The method according to claim 16, further comprising providing a user-selectable private mode release option on said graphic user interface, and requiring input of said user credentials through said graphic user interface when a user selects said private mode release option.

18. The method according to claim 16, further comprising producing scanned images using said scanner, and releasing said scanned images through said communications port to only ones of said remote computerized devices that provide said user credentials.

19. The method according to claim 16, said graphic user interface being integral with said apparatus.

20. The method according to claim 16, said remote computerized devices being connected to said communications port by a network.

* * * * *